Figure 1:
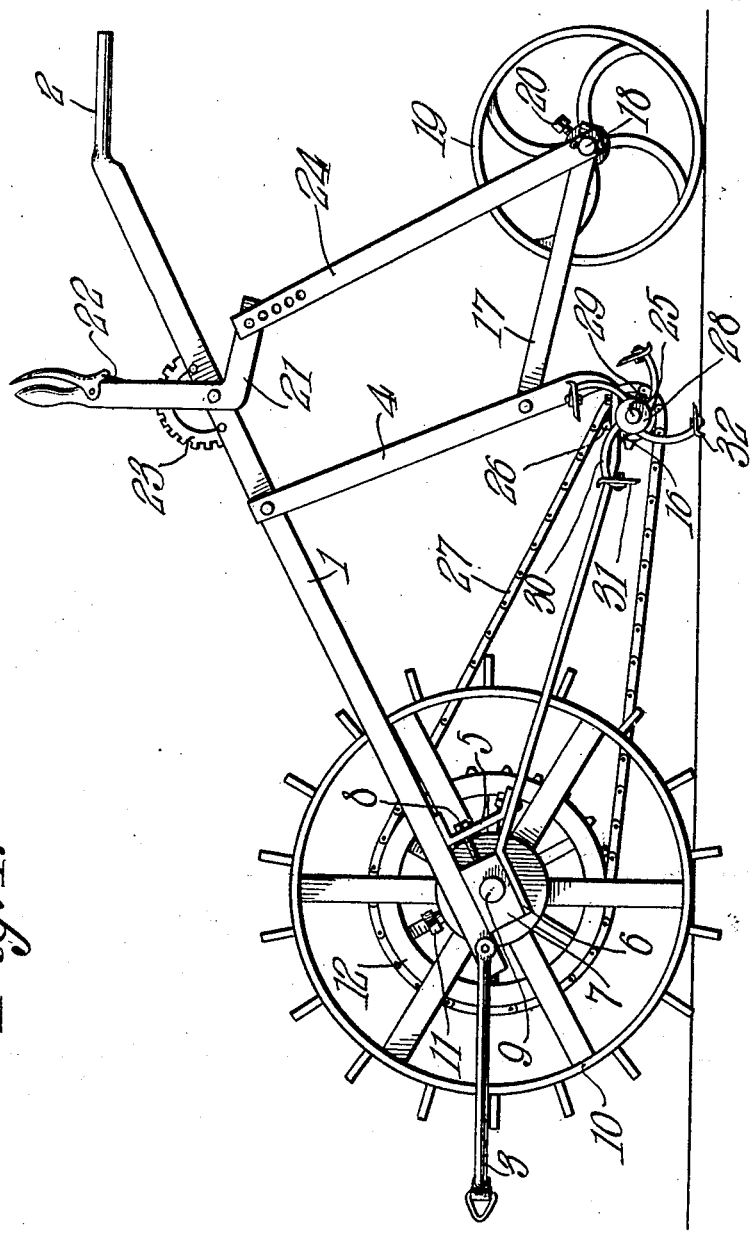

A. P. GRANGER.
IMPLEMENT FOR HOEING AND TOPPING GROWING PLANTS.
APPLICATION FILED FEB. 20, 1908.

913,953.

Patented Mar. 2, 1909.
2 SHEETS—SHEET 1.

Witnesses
E. F. Stuart
C. Daniels

Inventor
Adolphus P. Granger.
By C. A. Snow & Co.
Attorneys

A. P. GRANGER.
IMPLEMENT FOR HOEING AND TOPPING GROWING PLANTS.
APPLICATION FILED FEB. 20, 1908.
913,953.
Patented Mar. 2, 1909.
2 SHEETS—SHEET 2.
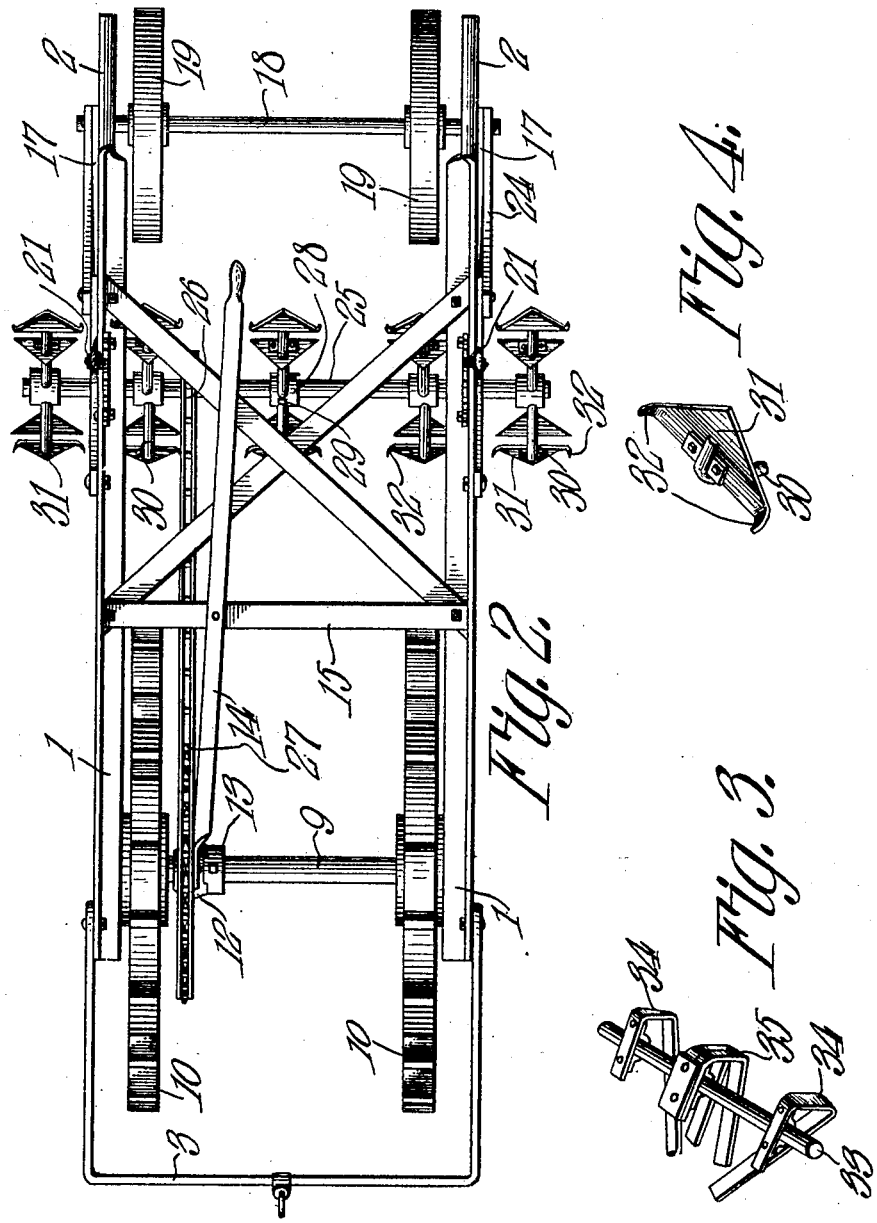
Witnesses
Inventor
Adolphus P. Granger.
By
Attorneys

UNITED STATES PATENT OFFICE.

ADOLPHUS P. GRANGER, OF NASHUA, IOWA.

IMPLEMENT FOR HOEING AND TOPPING GROWING PLANTS.

No. 913,953.           Specification of Letters Patent.           Patented March 2, 1909.

Application filed February 20, 1908. Serial No. 416,936.

*To all whom it may concern:*

Be it known that I, ADOLPHUS P. GRANGER, a citizen of the United States, residing at Nashua, in the county of Chickasaw and State of Iowa, have invented a new and useful Implement for Hoeing and Topping Growing Plants, of which the following is a specification.

This invention has relation to implements for hoeing and topping growing plants and it consists in the novel construction and arrangement of its parts as hereinafter shown and described.

The object of the invention is to provide an implement of the character indicated which is adapted to be used to advantage for hoeing or thinning plants standing in rows by passing the implement transversely across the row. By removing the hoes from the implement and substituting in place thereof a series of blades the implement may be used for removing the tops from the plants by being passed longitudinally along the rows. Such an implement is especially adapted to be used for cultivating and harvesting sugar beet and similar cereals.

In the accompanying drawings: Figure 1 is a side elevation of the implement. Fig. 2 is a top plan view of the same. Fig. 3 is a perspective view of topping blades which may be used upon the implement. Fig. 4 is a detail perspective view of a portion of one of the hoes used on the implement.

The implement consists of the side bars 1, the upper ends of which are fashioned into the handle grips 2. The draft yoke 3 is pivotally connected to the forward end of the bars 1. The said bars 1 are downwardly inclined toward the forward end of the implement. The brackets 4 depend from the bars 1 and are angular in side elevation. The material of which the said brackets are formed is twisted at the apices of the angles thereof so that the forward portions of the said brackets lie in planes at right angles to the rear portions thereof. The forward portions of the brackets 4 are connected with the lower portions of the bars 1 by means of the braces 5 and the forward extremities of the brackets 4 are parallel with the forward ends of the bars 1 as at 6. The boxes 7 are slidably mounted between the portions 6 of the said bracket and the bars 1. The screws 8 pass transversely through the braces 5 and bear at their ends against the boxes 7 and are designed to shift the said boxes longitudinally when they are rotated. The axle 9 is journaled for rotation in the boxes 7. The traction wheels 10 are mounted upon the axle 9 and may be shifted along the same and secured thereon in an adjusted position by means of the set screws 11 which pass through the hubs of the said wheels and are adapted to engage with said axle. The sprocket wheel 12 is slidably mounted upon the axle 9 and is provided with a clutch hub. The clutch member 13 is adjustably mounted upon the axle 9 and may be fixed at any desired point thereon. The lever 14 is fulcrumed to the cross piece 15 which connects the side bars together and the working end of said lever engages the hub of the sprocket wheel 12 and may shift the said wheel along the axle 9 in and out of engagement with the clutch member 13 when it (the lever) is swung. The bearings 16 are attached to the lower portions of the bracket 4. The links 17 are pivotally connected at their forward ends to the rear portion of the brackets 4. The axle 18 is journaled for rotation in the rear ends of the links 17. The ground wheels 19 are mounted upon the axle 18 and may be shifted longitudinally thereof and secured at desired points by means of the set screws 20. The angle levers 21 are fulcrumed to the bars 1 and are provided with pawls 22 which are adapted to engage the gear segments 23 fixed to the said bars. The upper ends of the links 24 are adjustably connected with the working ends of the angle levers 21 and the axle 18 is journaled in the lower ends of the said links 24.

When the implement is used for hoeing or thinning a stand of plants the shaft 25 is journaled for rotation in the bearings 16. The sprocket wheel 26 is adjustably mounted upon the shaft 25 and the sprocket chain 27 passes around the wheel 12 and wheel 26. Each sleeve 28 is provided with a set screw 29 by means of which the said sleeves may be adjusted along the shaft 28 and fixed in an adjusted position thereon. The curved arms 30 extend out from the sleeve 28 and the hoes 31 are mounted upon the outer ends of the said arm. The said hoes are substantially triangular in shape with the ends at their corners turned down beyond the outer side of the hoe as at 32.

The operation of the implement when equipped with the hoes is as follows: The traction wheels 10 are spaced at suitable intervals apart and the supporting wheels 19 are brought into alinement with the said wheels 10. The sleeves 28 are spaced at desired intervals apart, however, there is one sleeve in alinement with each traction wheel 10. The implement is then drawn transversely along the row of plants and the hoes will rotate about an axis in the same direction as the wheels 10 rotate. By manipulating the levers 21 the hoes may be caused to operate at different depths in the ground or one lever 21 only may be operated so that the hoes at one side of the implement will operate in the ground at a depth different from the hoes at the other side of the implement. By shifting the boxes 7 along their guides the angle at which the hoes will enter the ground may be varied and also the slack in the chain 27 may be taken up or adjusted. As the hoes 31 rotate their forward edges cut out the plants to be removed and the depending lugs 32 cut the roots of adjacent plants left standing so that the hoes will not drag the standing plants out of position. In as much as there is a set of hoes immediately behind each traction wheel 10 the plants that are broken down by the said traction wheels are among those that are cut out by the hoes. It will thus be seen that each hoe is provided at each side or end with a depending lug which serves in the nature of a colter.

When it is desired that the hoes should cease operating while the implement is in motion the operator may swing the lever 14 which will shift the wheel 12 away from the clutch member 13 and thus the hoes will come to a state of rest. When making turns or when moving the implement from place to place the hoes can be elevated above the surface of the ground by swinging the lever 21 to the rear.

When it is desired to use the implement for the purpose of cutting the tops from the plants at harvest time or just prior thereto the shaft 25 and its attachments is removed from the bearing 16 and the shaft or bar 33 is inserted therein. The blades 34 and 35 are mounted upon the bar 33. The said blades are arranged in pairs which converge toward each other. The blades 34 being longer than the blades 35 and overlapping the ends thereof. Consequently as the implement is drawn along the rows of plants the tops thereof enter between the diverging ends of the blades 34 and 35 and are eventually encountered by the said blades and removed from the roots of the plants. When the blades for removing the tops are used it is also desirable to resort to the means for raising and lowering the rear portion of the implement for regulating the altitude at which the blades shall operate and for raising and lowering the same with respect to the surface of the soil; and the means for shifting the boxes 7 in order that the said blades may be presented to their work at a desired angle.

Having described my invention what I claim as new and desire to secure by Letters Patent is:

1. An implement as described comprising inclined side bars having their upper ends fashioned into handle grips brackets depending from the side bars, boxes slidably mounted at the forward ends of the brackets, means for shifting the boxes, an axle journaled for rotation in the boxes, wheels mounted upon the axle, earth engaging members carried by the brackets, lever mechanisms mounted upon the side bars and adapted to be independently operated, ground wheels located behind the brackets and being operatively connected with the brackets and lever mechanisms.

2. An implement as described comprising side bars, brackets depending therefrom, boxes adjustably mounted at the forward ends of the brackets, means for shifting the boxes, an axle journaled in the boxes, traction wheels adjustably mounted upon the axle, a shaft journaled for rotation at the lower portions of the brackets, means operatively connecting said shaft and said bracket, hoes arranged in series and adjustably mounted upon the shaft, links pivotally connected with the bracket, a shaft journaled in said links, ground wheels adjustably mounted upon the last said shaft, lever mechanisms fulcrumed upon the side bars and links connecting said lever mechanism with the last said shaft.

In testimony that I claim the foregoing as my own, I have hereto affixed my signature in the presence of two witnesses.

ADOLPHUS P. GRANGER.

Witnesses:
   W. A. DODD,
   A. O. BROWN.